US012200514B2

(12) United States Patent
Okada et al.

(10) Patent No.: US 12,200,514 B2
(45) Date of Patent: Jan. 14, 2025

(54) NETWORK MANAGEMENT APPARATUS AND NETWORK MANAGEMENT METHOD

(71) Applicant: RAKUTEN MOBILE, INC., Tokyo (JP)

(72) Inventors: Jun Okada, Tokyo (JP); Jayoung Oh, Tokyo (JP); Masaaki Kosugi, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/767,117

(22) PCT Filed: Jun. 23, 2021

(86) PCT No.: PCT/JP2021/023812
§ 371 (c)(1),
(2) Date: Apr. 7, 2022

(87) PCT Pub. No.: WO2022/269808
PCT Pub. Date: Dec. 29, 2022

(65) Prior Publication Data
US 2024/0107340 A1 Mar. 28, 2024

(51) Int. Cl.
*H04W 24/04* (2009.01)
*H04L 41/06* (2022.01)
(Continued)

(52) U.S. Cl.
CPC ............. *H04W 24/04* (2013.01); *H04L 41/06* (2013.01); *H04L 41/0631* (2013.01);
(Continued)

(58) Field of Classification Search
CPC .... H04W 24/04; H04L 41/06; H04L 41/0677; H04L 41/0631; H04L 41/0686; H04L 41/069; H04L 41/40
See application file for complete search history.

(56) References Cited

U.S. PATENT DOCUMENTS

2017/0353991 A1* 12/2017 Tapia ..................... G06Q 10/20
2018/0024852 A1    1/2018 Yabushita et al.
(Continued)

FOREIGN PATENT DOCUMENTS

JP    2018-026709 A    2/2018
JP    2020-072446 A    5/2020
WO    2016/121802 A1   8/2016

OTHER PUBLICATIONS

Martin et al, "Correlation of Failure Notifications", IBM, IPcom, 1994 (Year: 1994).*

*Primary Examiner* — Omer S Mian
(74) *Attorney, Agent, or Firm* — Sughrue Mion, PLLC

(57) ABSTRACT

Disclosed herein is a network management apparatus, comprising: a correlating information storage unit configured to store correlating information, about a failure that occurs, that correlates a notification notified when the failure occurs to a workaround for the failure; a notification acquisition unit configured to acquire, a plurality of notifications notified in relation to a plurality of components related to a device in which the failure has occurred, respectively; a failure determination unit configured to determine whether the failure is a known failure in which the notification is correlated to the workaround or an unknown failure, by referring to the correlating information based on the plurality of notifications; and a workaround determination unit configured to determine, when the failure is determined to be the known failure, the workaround that is correlated to a notification determined according to a predetermined ordering of the components, as the workaround to be applied.

12 Claims, 15 Drawing Sheets

(51) Int. Cl.
*H04L 41/0631* (2022.01)
*H04L 41/0686* (2022.01)
*H04L 41/069* (2022.01)
*H04L 41/40* (2022.01)

(52) U.S. Cl.
CPC ........ *H04L 41/0686* (2013.01); *H04L 41/069* (2013.01); *H04L 41/40* (2022.05)

(56) References Cited

U.S. PATENT DOCUMENTS

| | | | | |
|---|---|---|---|---|
| 2018/0211042 | A1* | 7/2018 | Reinecke | ............. G06F 21/568 |
| 2021/0409289 | A1 | 12/2021 | Yamagoe et al. | |
| 2022/0358441 | A1* | 11/2022 | Takada | .................. G06Q 10/00 |
| 2023/0327941 | A1* | 10/2023 | Zhou | .................... H04L 41/082 |
| | | | | 709/223 |

* cited by examiner

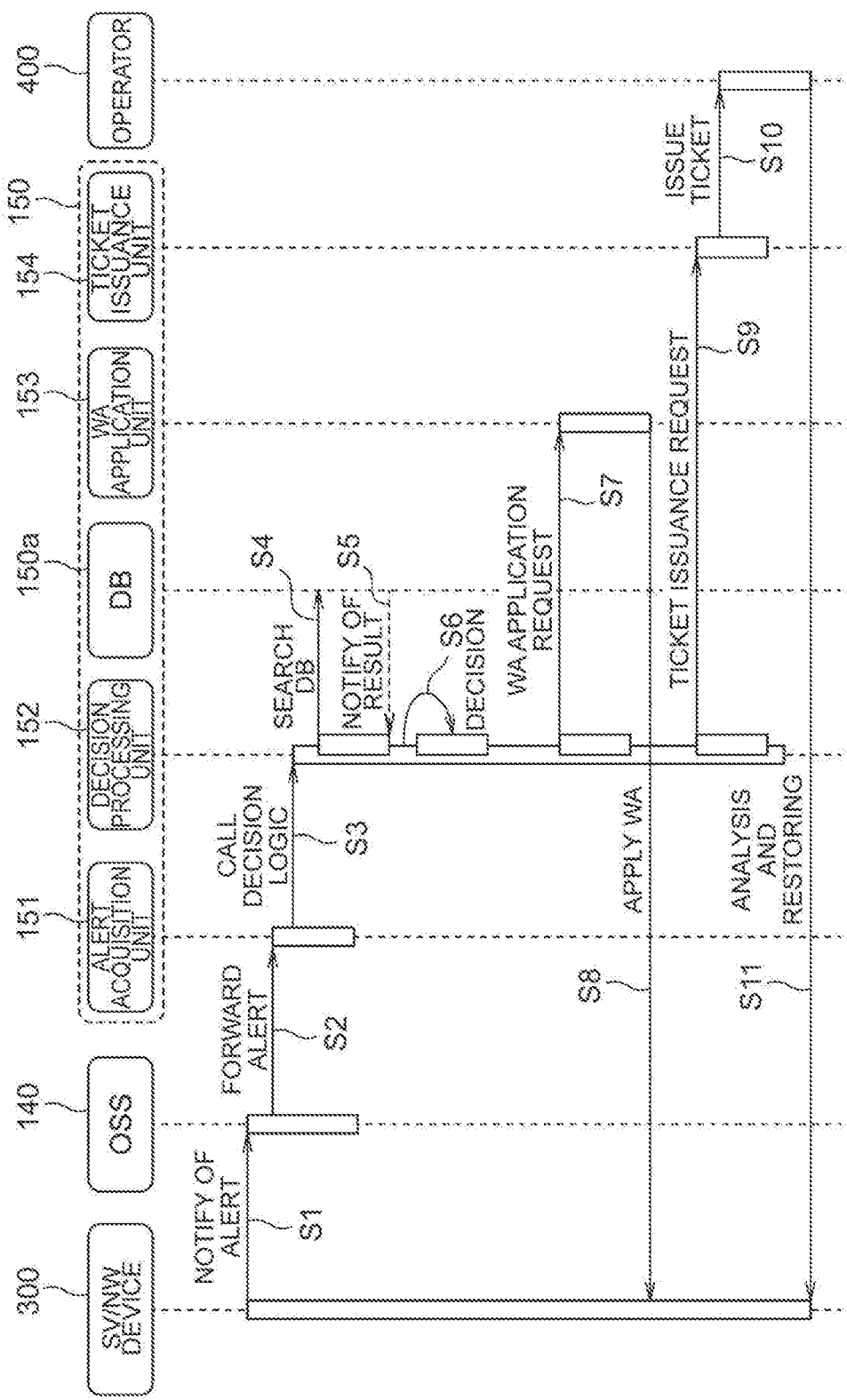

FIG. 5

| DEVICE TYPE | DEVICE NAME | ALERT TYPE | ALERT INFORMATION | DEVICE IDENTIFICATION INFORMATION | WA INFORMATION |
|---|---|---|---|---|---|
| Server | VENDOR NAME_ PRODUCT NAME A | HW/OS/Virt/App | FAILURE TIME, ALERT CONTENT | MAC ADDRESS, IP etc. | WA1 |
| Server | VENDOR NAME_ PRODUCT NAME B | HW/OS/Virt/App | FAILURE TIME, ALERT CONTENT | MAC ADDRESS, IP etc. | WA2 |
| NW DEVICE | VENDOR NAME_ PRODUCT C | HW/OS/Config | FAILURE TIME, ALERT CONTENT | MAC ADDRESS, IP etc. | WA3 |
| NW DEVICE | VENDOR NAME_ PRODUCT D | HW/OS/Config | FAILURE TIME, ALERT CONTENT | MAC ADDRESS, IP etc. | WA4 |
| Server/NW DEVICE | VENDOR NAME A PRODUCT C_VENDOR NAME_PRODUCT C | HW/OS/Virt/ Config/App | FAILURE TIME, ALERT CONTENT | MAC ADDRESS, IP etc. | WA5 |
| Server/NW DEVICE | VENDOR NAME B PRODUCT D_VENDOR NAME_PRODUCT D | HW/OS/Virt/ Config/App | FAILURE TIME, ALERT CONTENT | MAC ADDRESS, IP etc. | WA6 |

150b

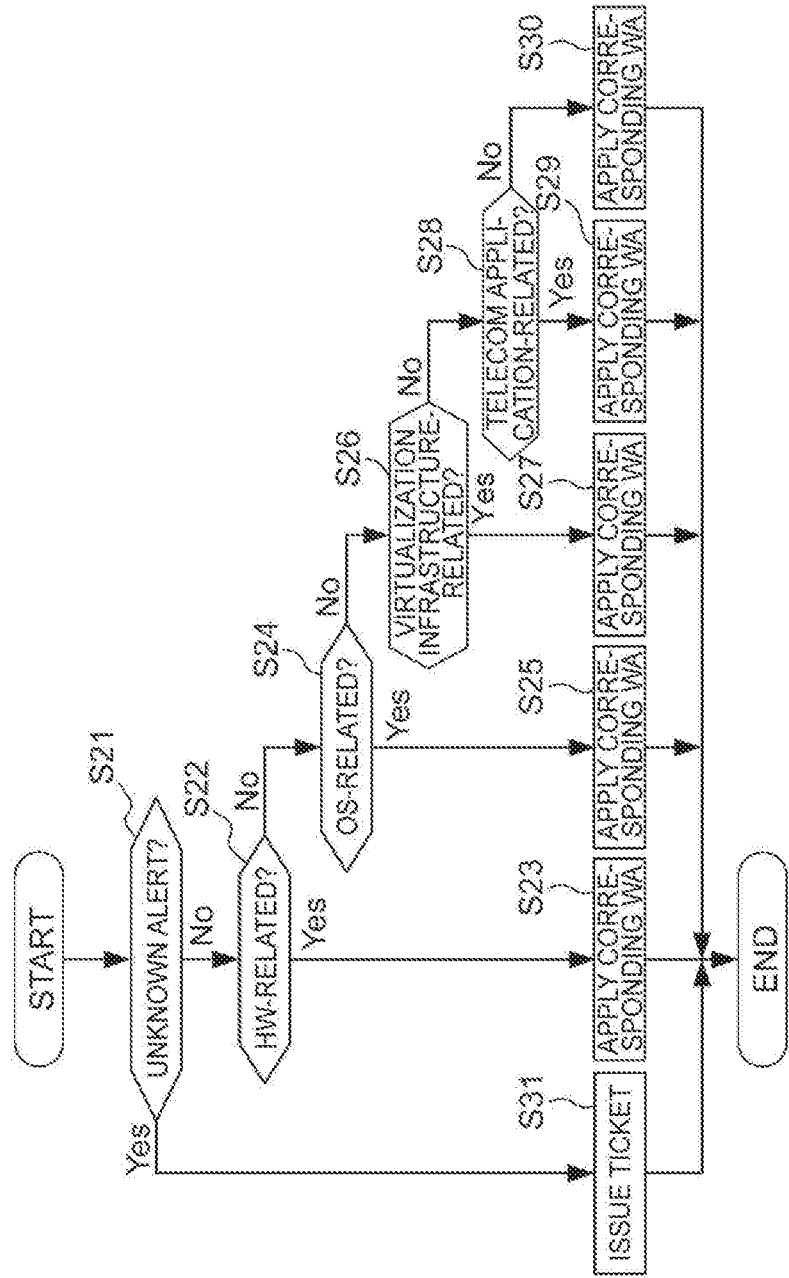

FIG. 10

| LAYER | NAME |
|---|---|
| 7th | APPLICATION LAYER |
| 6th | PRESENTATION LAYER |
| 5th | SESSION LAYER |
| 4th | TRANSPORT LAYER |
| 3rd | NETWORK LAYER |
| 2nd | DATA LINK LAYER |
| 1st | PHYSICAL LAYER |

FIG. 11

| LAYER | NAME |
|---|---|
| 4th | APPLICATION LAYER |
| 3rd | TRANSPORT LAYER |
| 2nd | INTERNET LAYER |
| 1st | NETWORK INTERFACE LAYER |

FIG. 12

```
DEVICE TYPE       : Network Device
DEVICE NAME       : XXXXXXXXX
ALERT TYPE        : Config
ALERT
INFORMATION       : Failure in Configuration Update relating to IP Routing
DEVICE IDENTI-    : MAC Address    dead:beef:a::
FICATION
INFORMATION         BMC IP         dead:beef:b::
                    SSH IP         dead:beef:c::
WA
INFORMATION       : To Apply Correct Routing Configuration
```

FIG. 14

| | | 541 543 |
|---|---|---|
| DEVICE TYPE | : | Server |
| | | Network Device |
| DEVICE NAME | : | XXXXXXXXXX |
| | | XXXXXXXXXX |
| ALERT TYPE | : | Virt |
| | | Config |
| ALERT INFORMATION | : | Hypervisor down |
| | | Failure in Configuration Update relating to IP Routing |
| DEVICE IDENTI-FICATION INFORMATION | : | Server Identification Information |
| | | Network Device Identification Information |
| WA INFORMATION | : | To Apply Correct Routing Configuration |

| | | |
|---|---|---|
| DEVICE TYPE | : | Server |
| | | Network Device |
| DEVICE NAME | : | XXXXXXXXX |
| | | XXXXXXXXX |
| ALERT TYPE | : | HW |
| | | Config |
| ALERT INFORMATION | : | Fault LED=01 / Correctable Memory Error |
| | | Massive Packet Loss |
| DEVICE IDENTI-FICATION INFORMATION | : | Server Identification Information |
| | | Network Device Identification Information |
| WA INFORMATION | : | To Flash System Log via BMC IP |

NETWORK MANAGEMENT APPARATUS AND NETWORK MANAGEMENT METHOD

CROSS REFERENCE TO RELATED APPLICATIONS

This application is a National Stage of International Application No. PCT/JP2021/023812 filed Jun. 23, 2021.

TECHNICAL FIELD

The present invention relates to a network management apparatus, a network management method, and a program thereof, and in particular to a technique for analyzing failures that have occurred in a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Patent Literature

PATENT LITERATURE 1: International Publication of PCT International Patent Application No. WO2016/121802 A

SUMMARY OF THE INVENTION

Problems to be Solved by the Invention

Mobile networks need to meet high reliability and high availability requirements. Therefore, when a failure occurs in the mobile network, it is required to analyze the cause of the failure and restore the network expeditiously.

However, recent mobile networks are virtualized networks constructed on a virtualization infrastructure, and the virtualized environment of the mobile network is constituted with multiple layers, such as a physical layer, a virtualization layer, and an application layer. In addition, different vendor products are used for each of the layers, respectively.

When a failure occurs in such a multi-layer and multi-vendor virtualized network, a plurality of alerts notifying of the occurrence of the failure are likely to be issued from a plurality of vendor products on a plurality of layers. In other words, a large number of alerts are likely to be issued with respect to a single failure. Furthermore, those alerts may not necessarily be standardized, and thus the error code system may vary from vendor to vendor.

For this reason, in order to identify the cause of the failure, it is necessary to analyze many types of alerts that are issued in such a large number, which makes it difficult to expeditiously identify the cause of the failure and deal with the failure.

The present invention has been made in order to solve the above mentioned problems and an object thereof is to provide a network management apparatus, a network management method, and a program thereof capable of dealing with a failure that has occurred in a large-scale network more expeditiously.

Solution to Problems

In order to solve the above mentioned problems, according to one aspect of the present invention, there is provided a network management apparatus, comprising: a correlating information storage unit configured to store correlating information, about a failure that occurs in a network, that correlates a notification notified when the failure occurs to a workaround for the failure; a notification acquisition unit configured to acquire, when the failure occurs in the network, a plurality of notifications that are notified in relation to a plurality of components related to a device in which the failure has occurred, respectively; a failure determination unit configured to determine whether the failure is a known failure in which the notification is correlated to the workaround or an unknown failure in which the notification is not correlated to the workaround, by referring to the correlating information stored by the correlating information storage unit based on the plurality of notifications acquired by the notification acquisition unit; and a workaround determination unit configured to determine, when the failure is determined to be the known failure by the failure determination unit, the workaround that is correlated to a notification determined according to a predetermined ordering of the components, from among the plurality of notifications acquired by the notification acquisition unit, as the workaround to be applied.

The workaround determination unit may sequentially refer to, for the plurality of notifications acquired by the notification acquisition unit, the correlating information stored by the correlating information storage unit according to the ordering, determine whether or not the workaround correlated to the notification exists, and determine the workaround corresponding to the notification that is first determined to have a correlated workaround, as the workaround to be applied.

When the plurality of notifications acquired by the notification acquisition unit belong to a notification related to a server constituting a virtualized environment, the workaround determination unit may determine the workaround to be applied according to the ordering that is set in order starting from a lowermost layer of a hierarchical structure in which hardware, an operating system (OS), a virtualization layer, and an application that constitute the server are in turn stacked.

When the plurality of notifications acquired by the notification acquisition unit belong to a notification related to a network device, the workaround determination unit may determine the workaround to be applied according to the ordering that is set in order starting from a lowermost layer of a hierarchical structure that corresponds to a transport layer and its lower layers of a network reference model realizing a communication function by the network device.

When at least one of the plurality of notifications acquired by the notification acquisition unit has a correlated workaround in the correlating information stored by the correlating information storage unit from among the plurality of notifications acquired by the notification acquisition unit, the failure determination unit may determine the failure to be the known failure.

The notification may include device information related to a device in which the failure has occurred and failure information related to a content of the failure.

The notification may include a device type indicating a type of a device in which the failure has occurred and time information indicating time of the failure, and, when the plurality of notifications acquired by the notification acquisition unit include notifications notified at the same time from a plurality of types of devices, the workaround determination unit may determine that a complex failure has occurred in the plurality of types of devices, and determines the workaround to be applied for the complex failure based on the notification notified at the same time from the plurality of types of devices.

The failure determination unit may determine, when the plurality of notifications acquired by the notification acquisition unit include notifications notified at the same time from a plurality of types of devices, whether the failure is the known failure or the unknown failure for each of the devices, and the workaround determination unit may determine, when the plurality of notifications acquired by the notification acquisition unit includes notifications notified at the same time from the plurality of types of devices, the workaround correlated to the notification that is determined according to the ordering from among the plurality of notifications related to the device of which failure is determined to be the known failure by the failure determination unit, as the workaround to be applied to the complex failure.

The network management apparatus may further comprise: a workaround execution unit configured to execute the workaround determined by the workaround determination unit.

The network management apparatus may further comprise: an informing unit configured to inform of, when the failure is determined to be the unknown failure by the failure determination unit, information related to the failure.

The informing unit may inform of the information related to the failure to a management department of a component corresponding to a single notification determined according to the ordering from among the plurality of notifications acquired by the notification acquisition unit.

According to another aspect of the present invention, there is provided a network management method performed by a network management apparatus, comprising steps of: storing correlating information, about a failure that occurs in a network, that correlates a notification notified when the failure occurs to a workaround for the failure: acquiring, when the failure occurs in the network, a plurality of notifications that are notified in relation to a plurality of components related to a device in which the failure has occurred, respectively; determining whether the failure is a known failure in which the notification is correlated to the workaround or an unknown failure in which the notification is not correlated to the workaround, by referring to the correlating information based on the plurality of notifications; and determining, when the failure is determined to be the known failure, the workaround that is correlated to a notification determined according to a predetermined ordering of the components, from among the plurality of notifications, as the workaround to be applied.

According to yet another aspect of the present invention, there is provided a network management program for causing a computer to execute network management processing, the program causing the computer to execute processing comprising: a correlating information storage process for storing correlating information, about a failure that occurs in a network, that correlates a notification notified when the failure occurs to a workaround for the failure; a notification acquisition process for acquiring, when the failure occurs in the network, a plurality of notifications that are notified in relation to a plurality of components related to a device in which the failure has occurred, respectively; a failure determination process for determining whether the failure is a known failure in which the notification is correlated to the workaround or an unknown failure in which the notification is not correlated to the workaround, by referring to the correlating information stored by the correlating information storage process based on the plurality of notifications acquired by the notification acquisition process; and a workaround determination process for determining, when the failure is determined to be the known failure by the failure determination process, the workaround that is correlated to a notification determined according to a predetermined ordering of the components, from among the plurality of notifications acquired by the notification acquisition process, as the workaround to be applied.

Advantageous Effect of the Invention

According to the present invention, it makes it possible to deal with a failure that has occurred in a large-scale network more expeditiously.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 4 is a sequence chart illustrating an exemplary operation of an alert analysis.

FIG. 5 is a schematic diagram illustrating an exemplary description of an action definition table.

FIG. 6 is a flowchart illustrating an exemplary processing procedure of analysis processing of an alert notified from a server.

FIG. 10 is a schematic diagram illustrating the OSI reference model.

FIG. 11 is a schematic diagram illustrating the DARPA model (i.e., TCP/IP model).

FIG. 12 is schematic diagram illustrating an exemplary alert in the case of occurrence of a known failure of a single network device.

FIG. 14 is a schematic diagram illustrating an exemplary alert in the case of occurrence of a complex failure of the unknown failure of the server and the known failure of the network device.

FIG. 15 is a schematic diagram illustrating an exemplary alert in the case of occurrence of the complex failure of the known failure of the server and the unknown failure of the network device.

DESCRIPTION OF EMBODIMENTS

Figure 1:
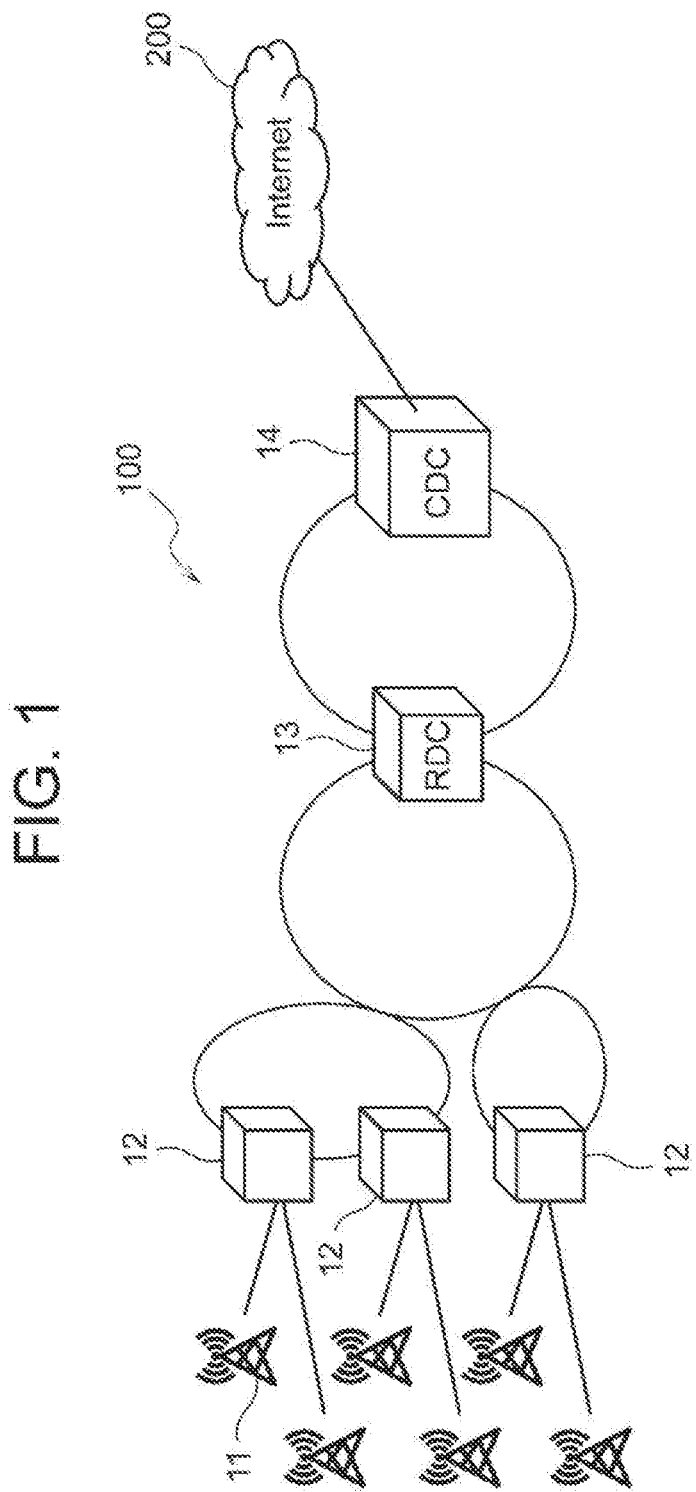
FIG. 1 is a conceptual diagram illustrating an exemplary network configuration of a mobile network including a network management apparatus according to the present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has an alert analysis function that performs a primary analysis to identify and deal with a component where a failure is considered to have occurred (i.e., suspected component) based on a plurality of notifications (hereinafter referred to as "alerts") that are notified when the failure occurs in a mobile network constructed on a virtualization infrastructure. Here, the above alert includes an error, a warning, and a notice.

More particularly, the network management apparatus collates the plurality of alerts, which are notified when a failure occurs, with correlating information that correlates the alerts to workarounds (hereinafter referred to as "WAs"), respectively, and determines whether the failure occurring is a known failure, in which the alert is correlated to the WA, or an unknown failure, in which the alert is not correlated to the WA.

According to the present embodiment, a certain case will be described in which the correlating information is information that correlates the alerts to the WAs based on events that have previously occurred, and the network management apparatus determines whether a failure occurring is a known failure that has previously occurred or an unknown failure that has not previously occurred by collating a plurality of alerts notified when the failure occurs with the correlating information. It should be noted that the above correlating information may be any information that correlates the alerts to the WAs, and is not limited to information that correlates the alerts to the WAs for failures that actually occurred in the past.

Then, when the network management apparatus determines the failure occurring to be the known failure, the network management apparatus selects an alert (e.g., a single alert) that is considered to be notified in relation to the suspected component from among the plurality of alerts, and determines, as the WA to be applied, a WA correlated to the selected alert. On the other hand, when the network management apparatus determines the failure occurring to be the unknown failure, the network management apparatus informs of information on the failure to a department in charge.

It should be noted that the term "WA" refers to measures to temporarily avoid a problem or reduce the adverse influence thereof when the problem has occurred in a network.

FIG. 1 is a conceptual diagram illustrating an exemplary network configuration of a mobile network. 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment may be a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like.

The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
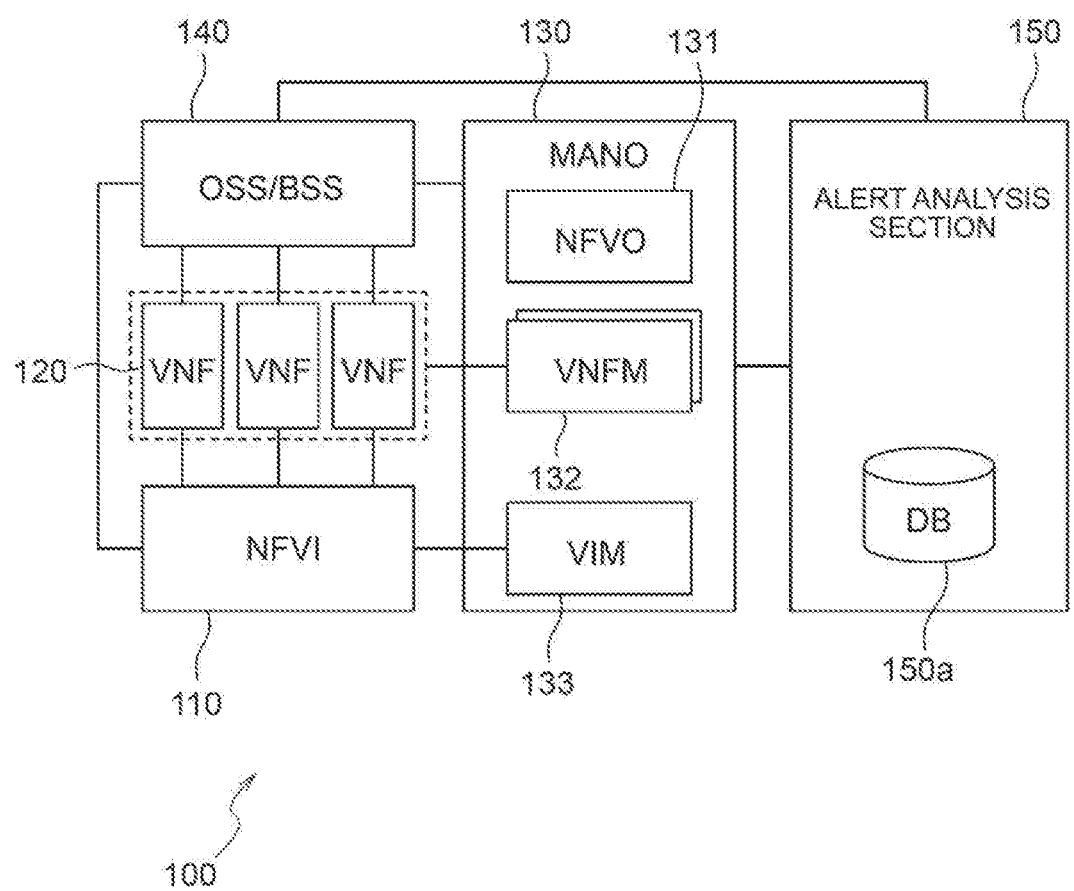
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NEVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

An alert analysis section 150 realizes an alert analysis function that acquires a plurality of alerts notified when a failure occurs and analyzes the plurality of acquired alerts to perform the primary analysis. The alert analysis section 150 serves as the network management apparatus according to the present embodiment.

The alert analysis section 150 is equipped with an alert management database (DB) 150a. The alert analysis section 150 refers to the alert management database 150a based on a plurality of alerts acquired when the failure has occurred to perform the primary analysis.

Here, the alert management database 150a serves as a correlating information storage unit storing the correlating information that correlates the alert notified when a failure occurs in the mobile network 100 to the workaround (WA) for the failure. The alert management database 150a stores the correlating information for the failures that have previously occurred in the mobile network 100. It should be noted that the alert management database 150a may be a volatile memory or the like that acquires the above correlating information from outside and stores the correlating information temporarily.

In addition, the alert analysis section 150 is not limited to the case where the alert analysis section 150 is an external function of the OSS/BSS 140 or the MANO 130 as shown in FIG. 2. The alert analysis section 150 may be provided inside the OSS/BSS 140 or the MANO 130. In this case, the alert analysis function of the alert analysis section 150 is a part of functions of the OSS/BSS 140 or the MANO 130.

Figure 3:
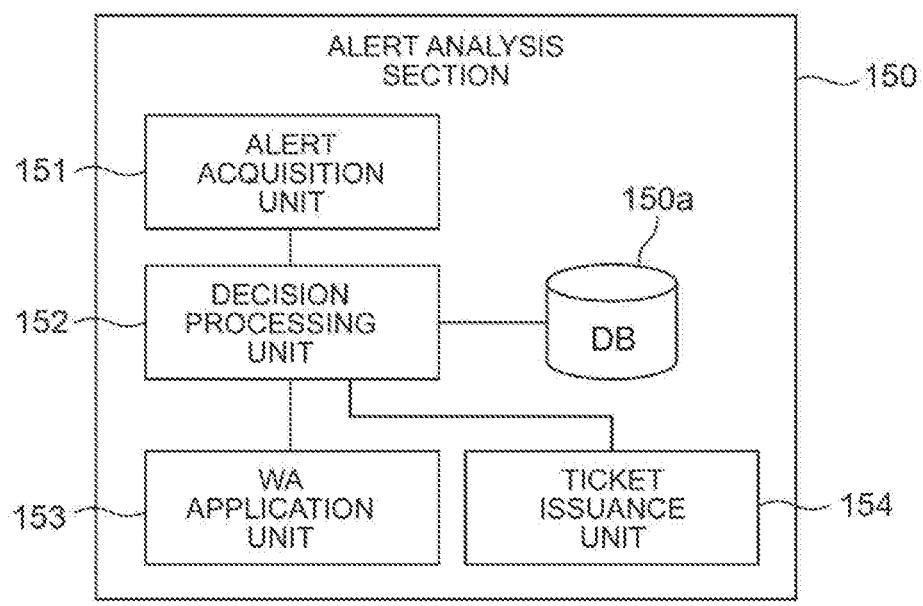
FIG. 3 is a block diagram illustrating an exemplary functional configuration of an alert analysis section according to the present embodiment.

FIG. 3 is a block diagram illustrating an exemplary functional configuration of the alert analysis section 150.

As shown in FIG. 3, the alert analysis section 150 includes an alert acquisition unit 151, a decision processing unit 152, a workaround application unit (i.e., WA application unit) 153, and a ticket issuance unit 154.

The alert acquisition unit 151 serves as a notification acquisition unit that acquires a plurality of alerts notified when a failure occurs.

The mobile network 100 according to the present embodiment is a virtualized network constructed on the virtualization infrastructure. The virtualized environment constituting the mobile network 100 is constituted with stacked layers, from hardware to applications. More particularly, the servers that constitute the virtualized environment are realized in a hierarchical structure in which the hardware, the host OS, the virtualization layer software (i.e., virtualization infrastructure), and the applications (i.e., telecom applications) software are all stacked in this order.

In this way, when a certain kind of failure occurs in the network implemented in the above multi-layer structure, a plurality of alerts notifying of the failure will be notified corresponding to the respective layers.

For example, when a hardware failure (e.g., memory defect) occurs, such hardware failure may incur operational defects in the host OS, the virtualization infrastructure, and the telecom applications deployed on the hardware concerned as well. For this reason, in addition to the alert related to the hardware, which is the direct source of the failure, alerts related to the host OS, the virtualization infrastructure, and the telecom applications are likely to be issued as well.

Thus, when a failure occurs in relation to the component in a lower layer, components in the upper layers above the lower layer may also be adversely affected, and a plurality of alerts are likely to be notified from a plurality of layers, respectively.

The communication functions in the mobile network 100 are able to be defined by a network reference model that is divided into a multi-layer hierarchical structure. The network reference models include the OSI reference model and the DARPA model (i.e., TCP/IP model). In this way, the mobile network 100 also has a hierarchical structure (i.e., multi-layer structure) for the communication functions, and even in the case of a failure related to a network device such as a switch or a router, a plurality of alerts are likely to be notified in relation to a plurality of multiple layers, respectively.

The alert acquisition section 151 acquires a plurality of alerts, which are notified in relation to a plurality of components, respectively, with respect to a single failure, as described above.

The decision processing unit 152 has the following functions: a failure determination unit that collates a plurality of alerts acquired by the alert acquisition unit 151 with the alert management database 150a to determine whether the failure occurring is the known failure or the unknown failure; and a workaround determination unit that determines the WA to be applied when the failure occurring is determined to be the known failure.

When the decision processing unit 152 determines the failure occurring to be the known failure and determines the WA to be applied (i.e., to-be-applied WA), the decision processing unit 152 sends a WA application request to the WA application unit 153. On the other hand, when the decision processing unit 152 determines the failure occurring to be the unknown failure, the decision processing unit 152 sends a request for ticket issuance to the ticket issuance unit 154. Here, the term "ticket issuance" refers to informing a department in charge of the failure of information on the failure and requesting the department to analyze the cause of the failure and perform restoring operations.

The WA application unit 153 serves as a workaround execution unit that receives the WA application request from the decision processing unit 152 and executes the WA with respect to the WA application target. The WA application request includes the identification information of the device to which the WA is applied and information on the WA to be applied.

The ticket issuance unit 154 serves as an informing unit that receives the ticket issuance request from the decision processing unit 152 and informs the department in charge of the failure of the information on the failure. The ticket issuance request includes information on a department that is a destination of the ticket issuance and information on the alert.

FIG. 4 is a sequence diagram illustrating an exemplary operation of the alert analysis processing performed by the alert analysis section 150.

When a certain kind of failure occurs in the mobile network 100, first in step S1, alerts are notified from a device 300 such as a server or a network device ("SV/NW Device") to the OSS 140. The alerts that are notified at this time are a plurality of alerts related to respective components constituting the above hierarchical structure, respectively.

Subsequently, in step S2, the OSS 140 forwards the notified alerts to the alert acquisition unit 151 of the alert analysis section 150.

In Step S3, the alert acquisition unit 151 further forwards the alerts forwarded from the OSS 140 to the decision processing unit 152 and requests the decision processing unit 152 to call the decision logic (e.g., source codes, binary files, configuration files, or the like).

In Step S4, the decision processing unit 152 calls the decision logic and refers to the alert management database 150a based on the alerts received from the alert acquisition unit 151 to determine whether the failure occurring is the known failure or the unknown failure.

FIG. 5 is a schematic diagram illustrating an exemplary description of an action definition table 150b, which is an example of the correlating information stored in the alert management database 150a that correlates alerts to WAs.

As shown in the FIG. 5, the action definition table 150b stores a device type, a device name, an alert type, alert information, device identification information, and WA information correspondingly.

The device type indicates whether the notified alert is related to a server ("Sever") or a network device ("NW Device").

The device name indicates a name of the device that issues the alert, and includes, for example, a vendor name or a product name.

The alert type indicates to which layer of the above described hierarchical structure the notified alert is related, in other words, to which component of the device that is experiencing the failure the notified alert is related.

This alert type indicates, when the device type is, for example, the server, whether the notified alert is hardware-related ("HW"), host OS-related ("OS"), virtualization layer software-related ("Virt"), or application software-related ("App").

Likewise, the alert type indicates, when the device type is the network device, whether the notified alert is hardware-related ("HW"), host OS-related ("OS"), or configuration-related ("Config").

The alert information includes time information indicating the time when the failure occurred (i.e., failure time) and the content of the alert.

The device identification information is identification information to identify the device (i.e., server and/or network device) in which the failure has occurred, and includes a MAC address, an IP address, or the like.

The WA information indicates information on the WA to be applied. The WA information may be, for example, the source codes of a program, the binary files, the configuration files, and the like required to execute the WA, or an ID to identify the WA.

As described above, the action definition table 150b includes the device type, the device name, and the device identification information, those of which are device information related to the device in which the failure has previously occurred, and the alert type and the alert information, those of which are failure information related to the content of the failure that has previously occurred.

In Step S4 shown in FIG. 4, the decision processing unit 152 searches the alert management database 150a using the alert forwarded from the alert acquisition unit 151 as a key for search. At this time, information to be used as the key for the search is the device information and the failure information described above (i.e., the device type, the device name, the alert type, the alert information, and the device identification information in FIG. 5).

Subsequently, as a result of searching the alert management database 150a, when an applicable record exists in the alert management database 150a and the WA information is associated with the applicable record, in step S5, the decision processing unit 152 receives the search result that associates the device identification information with the WA information in the applicable record.

On the other hand, as a result of searching the alert management database 150a, when no applicable record exists in the alert management database 150a, or when an applicable record exists but no WA information is associated with the applicable record (e.g., "null" is set to the WA information), in step S5, the decision processing unit 152 receives the search result that the applicable record does not exist.

In step S6, the decision processing unit 152 determines whether to execute the WA or to issue a ticket based on the search result from the alert management database 150a.

More particularly, when the decision processing unit 152 receives a search result indicating that an applicable record exists in the alert management database 150a as the search result from the alert management database 150a, the decision processing unit 152 determines the failure occurring to be the known failure. In this case, the decision processing unit 152 determines to execute the WA, and then determines the devices to which the WA is to be applied (i.e., WA application target) and the WA to be applied (i.e., to-be-applied WA).

On the other hand, when the decision processing unit 152 receives a search result indicating that no applicable record exists in the alert management database 150a as the search result from the alert management database 150a, the decision processing unit 152 determines the failure occurring to be the unknown failure. In this case, the decision processing unit 152 determines to issue the ticket, and then determines the destination of the ticket issuance.

At this time, the decision processing unit 152 may identify the suspected component according to the predetermined ordering (i.e., ordering of components) based on the alert type, and determines the WA application target, the to-be-applied WA, and the destination of the ticket issuance.

The above decision processing by the decision processing unit 152 will be described below in detail.

When the decision processing unit 152 determines to execute the WA in step S6, subsequently in step S7, the decision processing unit 152 sends the WA application request to the WA application unit 153. The WA application request includes the device identification information of the WA application target and the WA information of the to-be-applied WA.

In step S8, upon receipt of the WA application request, the WA application unit 153 executes the WA with respect to the device 300, which is the source of the alert.

On the other hand, when the decision processing unit 152 determines to issue the ticket in step S6, subsequently in step S9, the decision processing unit 152 sends the ticket issuance request to the ticket issuance unit 154. The ticket issuance request includes information on the destination to which the ticket is issued and information on the alert.

In step S10, upon receipt of the ticket issuance request, the ticket issuance unit 154 issues the ticket to the operator 400 who is the destination of the ticket issuance. Subsequently in step S11, the operator 400 performs the analysis and restoring operations as appropriate.

Hereinafter, the decision processing performed by the decision processing unit 152 in step S6 shown in FIG. 4 will be described in detail.

When the decision processing unit 152 determines that there is a record in the alert management database 150a that coincides with an alert pattern of a plurality of alerts that have been notified (i.e., combination of alerts), the decision processing unit 152 may determine, as the to-be-applied WA, the WA that is correlated to the alert pattern concerned. On the other hand, when the decision processing unit 152 determines that there is no record in the alert management database 150a that coincides with the alert pattern of a plurality of alerts that have been notified, the decision processing unit 152 may perform the processing shown in FIGS. 6 and 7, and identify the suspected component according to the ordering (i.e., ordering of components) based on to the alert type to determine the WA application target, the to-be-applied WA, and the destination of ticket issuance.

FIG. 6 is a flowchart illustrating an exemplary processing procedure of the decision processing performed by the decision processing unit 152 in step S6 shown in FIG. 4. The processing shown in FIG. 6 is the decision processing in the case in which the device type of the notified alert indicates a server.

When the device type of the notified alert indicates a server, in step S21 of FIG. 6, the decision processing unit 152 determines whether or not the notified alert is the unknown alert, in other words, whether or not the failure occurring is the unknown failure. In this step S21, the decision processing unit 152 determines that the notified alert is not the unknown alert when the decision processing unit 152 determines that, based on the search result from the alert management database 150a, there is at least one alert to which any WA is correlated in the alert management database 150a from among a plurality of notified alerts.

Furthermore, when the decision processing unit 152 determines in step S21 that the notified alert is not the unknown alert, in other words, the failure occurring is the known failure, then in step S22 and subsequent steps, the decision processing unit 152 identifies the suspected component according to the predetermined ordering based on the alert type and determines the to-be-applied WA.

According to the present embodiment, when the device type of the notified alert indicates a server, the decision processing unit 152 sequentially determines whether or not there is a WA corresponding to the alert type in the order of hardware, the host OS, the virtualization infrastructure, and the telecom application (i.e., corresponding WA), The decision processing unit 152 then identifies, as the suspected component, the component related to the alert for which the corresponding WA is first determined to exist, and determines the corresponding WA corresponding to the alert concerned as the to-be-applied WA.

Considering a certain system as a hierarchical structure, for example, when a failure occurs in a component corresponding to the lowermost layer, secondary failures are also likely to occur in the components corresponding to the upper layers thereof. Therefore, when a plurality of alerts are issued for a plurality of components constituting the hierarchical structure, respectively, it can be assumed that the component corresponding to a lower layer is more likely to be the source of the failure.

For this reason, when the device type of the notified alert indicates a server, considering the hierarchical structure in which the hardware, the OS, the virtualization layer, and applications that constitute the server are stacked in this order, it is possible to identify the suspected component and determine the to-be-applied WA by sequentially determining the existence or non-existence of the corresponding WA in order starting from the lower layer of the hierarchical structure.

More particularly, in step S22 of FIG. 6, the decision processing unit 152 determines whether or not there is a hardware-related ("HW-related") alert for which a corresponding WA exists from among a plurality of notified alerts. When the decision processing unit 152 determines that the HW-related alert for which a corresponding WA exists, the processing proceeds to step S23, and the decision processing unit 152 determines the corresponding WA as the to-be-applied WA and terminates the processing shown in FIG. 6. On the other hand, when the decision processing unit 152 determines that there is no HW-related alert for which a corresponding WA exists, the processing proceeds to step S24.

Subsequently in step S24, the decision processing unit 152 determines whether or not there is a host OS-related ("OS-related") alert for which a corresponding WA exists from among a plurality of notified alerts. When the decision processing unit 152 determines that there is the OS-related alert for which a corresponding WA exists, the processing proceeds to step S25, and the decision processing unit 152 determines the corresponding WA as the to-be-applied WA, and then terminates the processing in FIG. 6. On the other hand, when the decision processing unit 152 determines that there is no OS-related alert for which a corresponding WA exists, the processing proceeds to step S26.

Yet subsequently in step S26, the decision processing unit 152 determines whether or not there is an alert related to software of the virtualization layer for which the corresponding WA exists ("Virtual Infrastructure-related") from among a plurality of notified alerts. When the decision processing unit 152 determines that there is the virtual infrastructure-related alert for which a corresponding WA exists, the processing proceeds to step S27, and the decision processing unit 152 determines the corresponding WA as the to-be-applied WA and terminates the processing shown in FIG. 6. On the other hand, when the decision processing unit 152 determines that there is no virtual infrastructure-related alert for which a corresponding WA exists, the processing proceeds to step S28.

Yet subsequently in step S28, the decision processing unit 152 determines whether or not there is a software-related alert of the applications ("telecom application-related") for which the corresponding WA exists from among a plurality of notified alerts. When the decision processing unit 152 determines that there is the telecom application-related alert for which a corresponding WA exists, the processing proceeds to step S29, and the decision processing unit 152 determines the corresponding WA as the to-be-applied WA and then terminates the processing shown in FIG. 6. On the other hand, when the decision processing unit 152 determines that there is no telecom application-related alert for which a corresponding WA exists, the processing proceeds to step S30.

In step S30, the decision processing unit 152 determines, as the to-be-applied WA, the corresponding WA of the alert that is none of HW-related, OS-related, virtual infrastructure-related, or telecom application-related, and terminates the processing shown in FIG. 6.

Referring back to step S21 in FIG. 6, when the decision processing unit 152 determines that the notified alert is the unknown alert, in other words, the failure occurring is the unknown failure, then the processing proceeds to step S31.

Subsequently in step S31, the decision processing unit 152 determines the destination of the ticket issuance. Here, the destination of the ticket issuing may be a predetermined department in charge.

The destination of the ticket issuance may also be determined based on the ordering of the alert types described above. In other words, when the device type of the alert indicates a server, the decision processing unit 152 may sequentially determine whether or not the relevant alert is notified in the following order of the alert types: the hardware, the host OS, the virtualization infrastructure, and the telecom application, and determine, as the destination of the ticket issuance, the department in charge tied to the component to which the relevant alert is first determined to be notified. In this case, for example, the decision processing unit 152 may determine the destination of the ticket issuance by referring to an organization management database that correlates respective components to management departments managing the respective components. In this way, it makes it possible to easily determine the management department that manages the component of the suspected component as the department in charge serving as the destination of the ticket issuance.

Figure 7:
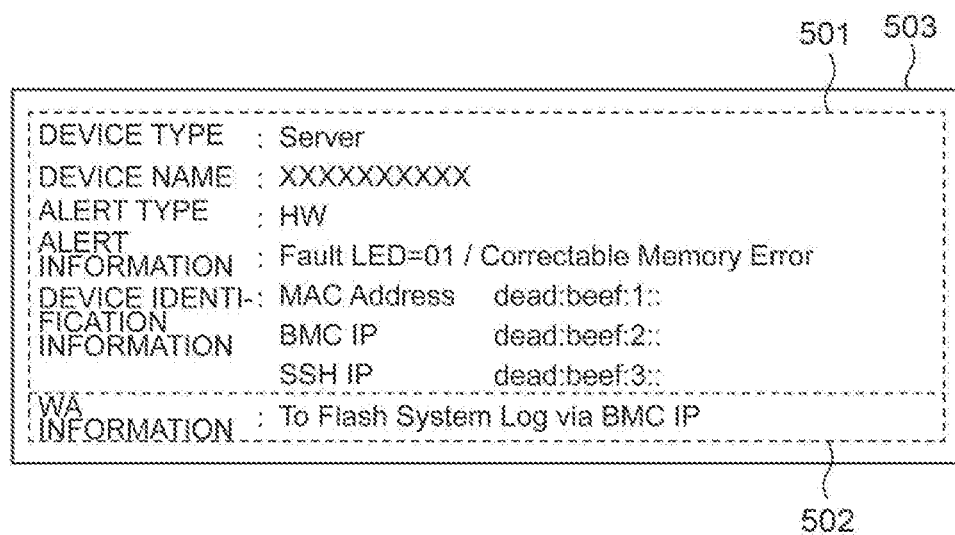
FIG. 7 is a schematic diagram illustrating an exemplary alert in the case of occurrence of a known failure of a single server.
Figure 8:
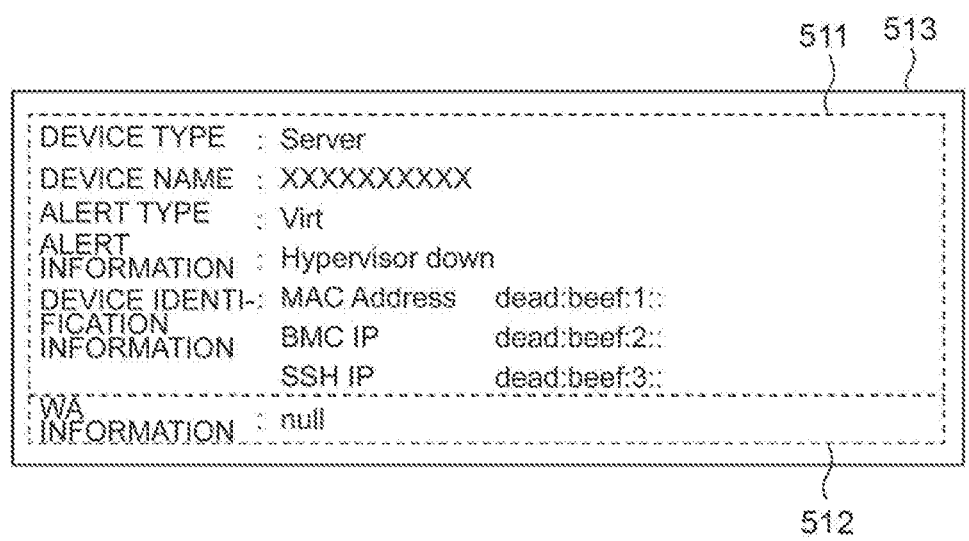
FIG. 8 is a schematic diagram illustrating an exemplary alert in the case of occurrence of an unknown failure of the single server.

FIGS. 7 and 8 are schematic diagrams illustrating exemplary failure patterns in case that a single or isolated failure occurs in a server, respectively.

Here, FIG. 7 illustrates an example of the known failure of a single server, and shows the correlating information S03 that correlates an alert 501, which is notified when a failure related to a memory of the server occurs, to the WA information 502, which is prepared and verified for the failure concerned. This correlating information 503 is stored in the alert management database 150a.

When a plurality of alerts including the alert 501 are notified, the decision processing unit 152 determines, in step S21 of FIG. 6, that the alert is not the unknown alert (i.e., "No" in step S21) and determines, in step S22, that there is the HW-related alert for which a corresponding WA exists. Therefore, in step S23, the decision processing unit 152 determines, as the to-be-applied WA, the WA information 502 shown in FIG. 7 ("to flash the system log via BMC IP").

As described above, according to the present embodiment, when a failure occurs and a plurality of alerts are notified resultantly, the alert analysis section 150 refers to the alert management database 150a without exploring the cause of the failure, and when the failure is determined to be the known failure, the alert analysis section 150 automatically determines, as the to-be-applied WA, the WA that is already prepared and verified. At this time, the alert analysis section 150 filters a plurality of alerts notified with respect to a single event to select (determine) the alert that is most likely to be relevant to the direct cause of the failure, and determines, as the to-be-applied WA, the corresponding WA of the selected alert. In other words, the alert analysis section 150 excludes alerts that are not relevant to the direct cause of the failure (i.e., secondary alerts) from among a plurality of alerts by filtering and does not use the excluded alerts for determining the to-be-applied WA.

It makes it possible to determine the to-be-applied WA more expeditiously and appropriately to execute the to-be-applied WA automatically.

FIG. 8 illustrates an example of the unknown failure of a single server, and shows the correlating information 513 that correlates an alert 511, which is notified when a failure occurs in the virtualization infrastructure layer of the server, and "null", which indicates that the corresponding WA is not prepared and verified as the WA information 512. The correlating information 513 is stored in the alert management database 150a.

The alert 511 is an alert that is notified due to a lack of communication from the management node. Although the possible causes are considered to include a hardware failure, a stuck (freezing) due to OS bugs, and communication problems via network devices, the actual cause cannot be identified by a single alert.

When the alert 511 is notified alone, the decision processing unit 152 determines the alert to be the unknown alert in step S21 of FIG. 6 ("Yes" in step S21), and determines to issue a ticket in step S31. Here, since the alert type of the alert 511 indicates "Virt", which means that the alert 511 is the virtual infrastructure-related alert, the decision processing unit 152 is able to determine the department in charge of the virtual infrastructure as the destination of the ticket issuance.

As described above, when a failure occurs and an alert is notified, the alert analysis section 150 checks the notified alert against previously occurred events, and when the failure notified by the alert is the unknown failure, the alert analysis section 150 issues the ticket to the department in charge. At this time, by determining the destination of the ticket issuance depending on the alert type, it makes it possible to request the appropriate department in charge to perform the analysis and restoring operations with respect to the failure as appropriate.

Furthermore, when a plurality of alerts are notified, the alert analysis section 150 may select the alert that is most likely to be relevant to the direct cause of the failure, and determine the department in charge corresponding to the selected alert as the destination of the ticket issuance. For example, when a plurality of alerts related to the hardware, the OS, and the virtualization infrastructure are notified, respectively, the alert analysis section 150 may determine that the hardware layer, which is the lowermost layer, is most likely to be relevant to the direct cause of the failure, and issue the ticket to the department in charge of the hardware. In this way, it makes it possible to perform the failure analysis more efficiently. In addition, the departments in charge of components that are not likely to be relevant to the direct cause of the failure, such as the departments in charge of the OS-related or virtual infrastructure-related components, are not required to perform the failure analysis so as to reduce the effort or labor of the person in charge.

Next, referring to FIG. 9, another decision processing will be described in case where the device type of the notified alert indicates a network device.

Figure 9:
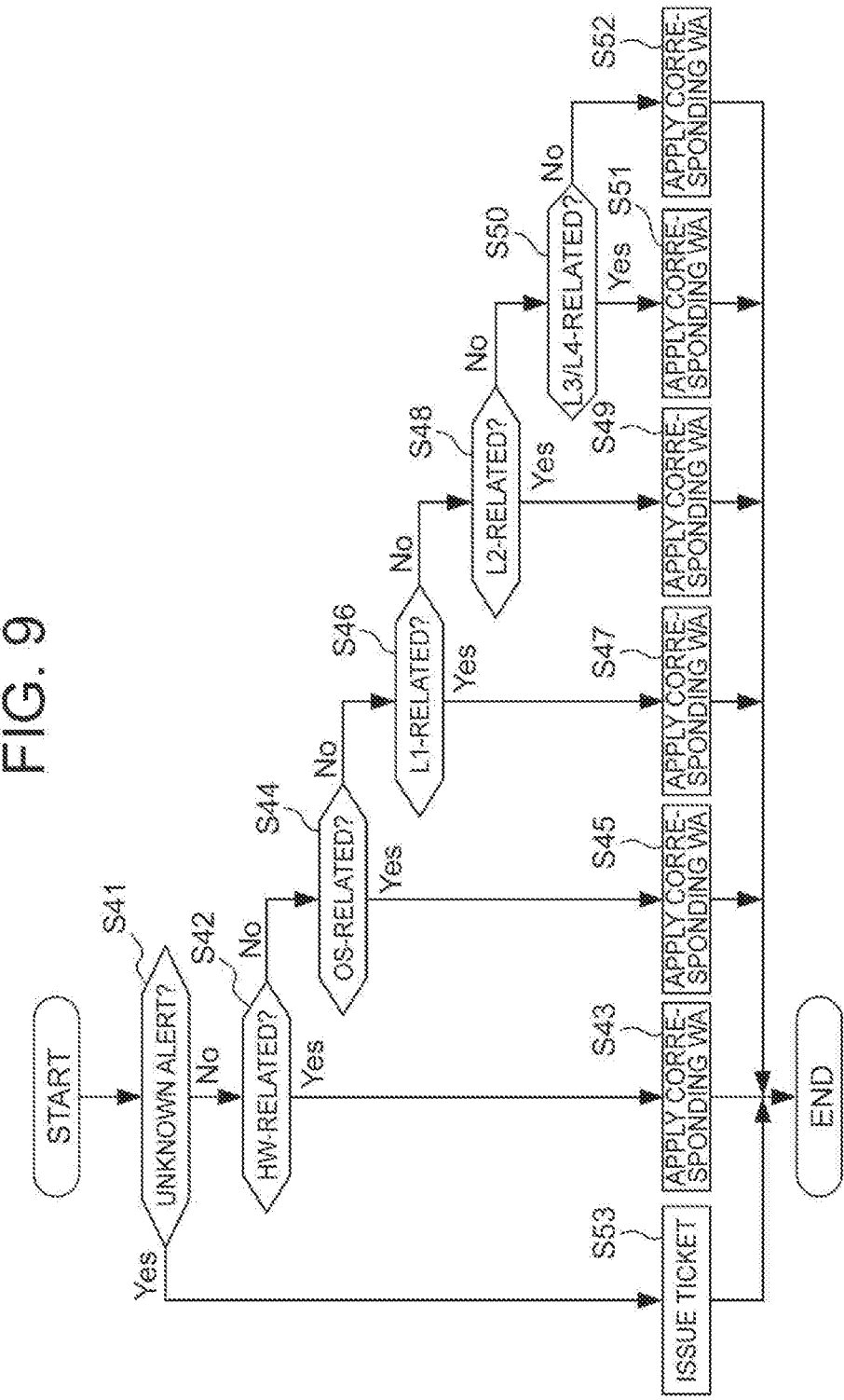
FIG. 9 is a flowchart illustrating an exemplary processing procedure of analysis processing of an alert notified from a network device.

When the device type of the notified alert indicates a network device, in step S41 of FIG. 9, the decision processing unit 152 determines whether or not the notified alert is the unknown alert, in other words, whether or not the failure occurring is the unknown failure. The processing of the step S41 is similar to the processing of step S21 in FIG. 6.

Subsequently, when the decision processing unit 152 determines in step S41 that the notified alert is not the unknown alert, in other words, the failure occurring is the known failure, then in step S42 and subsequent steps, the decision processing unit 152 identifies the suspected component according to the predetermined ordering based on the alert type to determine the to-be-applied WA.

According to the present embodiment, when the device type of the notified alert indicates a network device, the decision processing unit 152 sequentially determines whether or not there is a WA corresponding to the alert type in the following order: the hardware, the host OS, the first layer of the OSI reference model shown in FIG. 10 (L1), the second layer (L2), and the third and fourth layers (L3/L4). The decision processing unit 152 then identifies, as the suspected component, the component related to the alert for which the corresponding WA is first determined to exist, and determines the corresponding WA corresponding to the alert concerned as the to-be-applied WA.

It should be noted that the functional range handled by network devices, such as switches and routers, corresponds to layers from L1 to L4 of the OSI reference model, thus, the layers up to L4 are considered to be subject to the determination.

Furthermore, although a certain case is described here in which the ordering according to the OSI reference model shown in FIG. 10 is used, alternatively, the ordering according to the DARPA model shown in FIG. 11 may also be used.

Comparing the DARPA model with the OSI reference model, the first and second layers of the OSI reference model correspond to the first layer of the DARPA model, and the third and fourth layers of the OSI reference model correspond to the second and third layers of the DARPA model, respectively. Therefore, when using the ordering according to the DARPA model, the decision processing unit 152 may determine the existence or non-existence of the corresponding WA in the order of the hardware, the host OS, the first, second and third layers of the DARPA model shown in FIG. 11.

As described above, when the device type of the notified alert indicates a network device, by sequentially determining the existence or non-existence of the corresponding WA in the order starting from the lower layers in the hierarchical structure, which correspond to the transport layer and its lower layers of the network reference model realizing the communication functions of the network device, it makes it possible to identify the suspected component and determine the to-be-applied WA.

More particularly, in step S42 of FIG. 9, the decision processing unit 152 determines whether or not there is a hardware-related ("HW-related") alert for which a corresponding WA exists from among a plurality of notified alerts. When it is determined that there is the HW-related alert for which a corresponding WA exists, the processing proceeds to step S43, and the decision processing unit 152 determines the corresponding WA as the to-be-applied WA and then terminates the processing in FIG. 9. On the other hand, when it is determined that there is no HW-related alert for which a corresponding WA exists, the processing proceeds to step S44.

In Step S44, the decision processing unit 152 determines whether or not there is a host OS-related ("OS-related") alert for which the corresponding WA exists from among the notified alerts. When it is determined that there is the OS-related alert for which a corresponding WA exists, the processing proceeds to step S45, and the decision processing unit 152 determines the corresponding WA as the to-be-applied WA and then terminates the processing in FIG. 9. On the other hand, when it is determined that there is no OS-related alert for which a corresponding WA exists, the processing proceeds to step S46.

In Step S46, the decision processing unit 152 determines whether or not there is a L1-related alert for which the corresponding WA exists from among the notified alerts. When it is determined that there is the L1-related alert for which a corresponding WA exists, the processing proceeds to step S47, and the decision processing unit 152 determines the corresponding WA as the to-be-applied WA and then terminates the processing in FIG. 9. On the other hand, when it is determined that there is no L1-related alert for which a corresponding WA exists, the processing proceeds to step S48.

In Step S48, the decision processing unit 152 determines whether or not there is a L2-related alert for which the corresponding WA exists from among the notified alerts. When it is determined that there is the L2-related alert for which a corresponding WA exists, the processing proceeds to step S49, and the decision processing unit 152 determines the corresponding WA as the WA to be applied and terminates the processing in FIG. 9. On the other hand, when it is determined that there is no L2-related alert for which a corresponding WA exists, the processing proceeds to step S50.

In Step S50, the decision processing unit 152 determines whether or not there is a L3/L4-related alert for which the corresponding WA exists from among the notified alerts. When it is determined that there is the L3/L4-related alert for which a corresponding WA exists, the processing proceeds to step S51, and the decision processing unit 152 determines the corresponding WA as the to-be-applied WA and then terminates the processing in FIG. 9. On the other hand, when it is determined that there is no L3/L4-related alert for which a corresponding WA exists, the processing proceeds to step S52.

In step S52, the decision processing unit 152 determines, as the to-be-applied WA, the corresponding WA of the alert that is none of HW-related, OS-related, L1-related, L2-related, and L3/L4-related alerts, and then terminates the processing in FIG. 9.

Referring back to step S41 in FIG. 9, when it is determined that the notified alert is the unknown alert, in other words, the failure occurring is the unknown failure by the decision processing unit 152, the processing proceeds to step S53.

Subsequently in step S53, the decision processing unit 152 determines the destination of the ticket issuance. Here, the destination of the ticket issuance may be a predetermined department in charge.

The destination of the ticket issuance may also be determined based on the ordering of the alert types described above. In other words, when the device type of the alert indicates a network device, the decision processing unit 152 may sequentially determine whether or not the relevant alert is notified in the following order of the alert types: the hardware, the host OS, the L1, the L2, and L3/L4, and then determine, as the destination of the ticket issuance, the department in charge tied to the component to which the relevant alert is first determined to be notified. In this case, for example, the decision processing unit 152 may determine the destination of the ticket issuance by referring to the organization management database that correlates respective components to management departments managing the respective components. In this way, it makes it possible to determine the management department that manages the component of the suspected component as the department in charge serving as the destination of the ticket issuance more easily.

Figure 13:
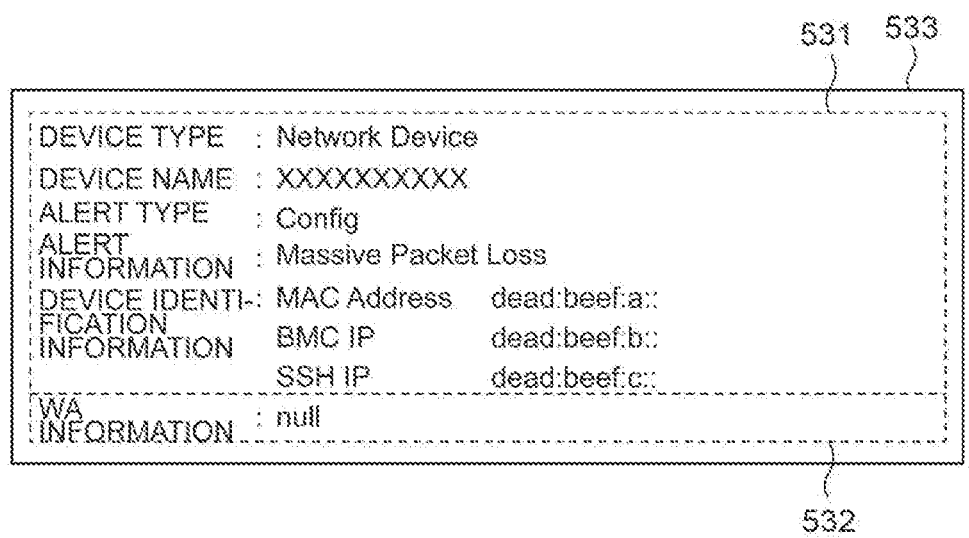
FIG. 13 is schematic diagram illustrating an exemplary alert in the case of occurrence of an unknown failure of the single network device.

FIGS. 12 and 13 are schematic diagrams illustrating exemplary failure patterns in the case where a single or isolated failure occurs in a network device.

Here, FIG. 12 illustrates an example of the known failure of a single network device, and shows the correlating information 523 that correlates an alert 521, which is notified when a failure related to the IP routing occurs, to the WA information 522, which is prepared and verified for the failure concerned. This correlating information 523 is stored in the alert management database 150a.

When a single alert 521 is notified alone, the decision processing unit 152 determines, in step S41 of FIG. 9, that the alert is not the unknown alert ("No" in step S41) and determines, in step S50, that there is an L3/L4-related alert for which a corresponding WA exists. Therefore, in step S51, the decision processing unit 152 determines, as the to-be-applied WA, the WA information 522 shown in FIG. 12 (i.e., "to apply a correct routing configuration").

Similarly to the above described failure patterns in FIG. 7, it makes it possible to determine the to-be-applied WA more expeditiously and appropriately to execute the to-be-applied WA automatically.

FIG. 13 illustrates an example of the unknown failure of a single network device, and shows the correlating information 533 that correlates an alert 531, which is notified when massive packet loss occurs in a network device, and "null", which indicates that the corresponding WA is not prepared and verified as the WA information 532. The correlating information 533 is stored in the alert management database 150a.

The cause of the alert 531 considerably varies, thus it is not possible to identify the cause and the extent of impact solely with a single alert.

When the alert 531 is notified alone, the decision processing unit 152 determines the alert to be the unknown alert in step S41 of FIG. 9 ("Yes" in step S41), and then determines to issue a ticket in step S51.

An alert such as the alert 531 shown in FIG. 13 or the alert 511 shown in FIG. 8 described above is not able to identify the cause of the failure as long as such alert is notified alone.

However, even when the cause of the failure cannot be identified solely with a single alert, in some cases it is possible to identify the cause of the failure by observing an alert related to the server and an alert related to the network device from a complex perspective.

FIGS. 14 and 15 illustrate examples of failure patterns in case that a complex failure occurs where alerts are notified from the server and the network device, respectively.

The alert 541 shown in FIG. 14 is an example where the alert 511 shown in FIG. 8 and the alert 521 shown in FIG. 12 are notified at the same time. In other words, FIG. 14 shows an example of an alert due to the complex failure of the unknown failure of the server and the known failure of the network device.

As described above, with the alert 511 of the server alone, the possible cause of failure could be considered to be the hardware failure, the stuck (i.e., freezing) due to OS bugs, or the communication problems via network devices, which makes it difficult to identify the cause of the failure. However, provided that another alert is also issued on the network device side at the same time, it is possible to determine that the cause of the failure is a communication problem via the network device and that the failure could be eliminated by resolving the communication problem. It is possible to determine whether or not alerts are notified at the same time based on the time information indicating the failure time (as shown in FIG. 5).

In other words, as shown in FIG. 14, the WA information 542 corresponding to the alert 541 may be the same as the WA information 522 corresponding to the alert 521 shown in FIG. 12. The correlating information 543 that correlates the alert 541 to the WA information 542 may be stored in the alert management database 150a.

The alert 551 shown in FIG. 1S is an example where the alert 501 shown in FIG. 7 and the alert 531 shown in FIG. 13 are notified at the same time. In other words, FIG. 15 shows an example of an alert due to the complex failure of the known failure of the server and the unknown failure of the network device.

As described above, with the alert 531 of the network device alone, it is difficult to identify the cause of the failure and the extent of impact. However, provided that another alert is also issued on the server side at the same time, it is possible to narrow down the cause of the failure and the extent of impact. In the case of the alert 551 shown in FIG. 15, it is possible to determine that a massive packet loss has occurred due to a memory error, and that the failure can be eliminated by taking measures on the server side.

In other words, as shown in FIG. 15, the WA information 552 corresponding to the alert 551 may be the same as the WA information 502 corresponding to the alert 501 shown in FIG. 7. The correlating information 553 that correlates the alert 551 to the WA information 552 may be stored in the alert management database 150*a*.

According to the present embodiment, as described above, when a plurality of notified alerts include alerts notified at the same time from a plurality of types of devices, the decision processing unit 152 may determine that the complex failure has occurred in the plurality of types of devices to determine the to-be-applied WA.

More particularly, the decision processing unit 152 may refer to the alert management database 150*a* and, when the decision processing unit 152 determines that there exists an alert pattern that coincides with the alert pattern of the notified complex failure, the decision processing unit 152 may determine the WA associated with the alert pattern as the to-be-applied WA.

In addition, the decision processing unit 152 may determine, as the to-be-applied WA for the complex failure occurring, the to-be-applied WA determined in the same way as in the case of the single failure described above with respect to the devices that are determined to have the known failure from among a plurality of types of devices.

In other words, when the server and the network device are both included in the device types of alerts notified at the same time, the decision processing unit 152 first determines whether the failure is the unknown failure or the known failure based on the alerts related to the server and the network device, respectively. When it is determined that the known failure has occurred solely on the server side, similarly to the case of the single failure of the server, the decision processing unit 152 performs the processing shown in FIG. 6 to determine the to-be-applied WA. On the other hand, when it is determined that the known failure has occurred solely on the network device side, similarly to the case of the single failure of the network device, the decision processing unit 152 performs the processing shown in FIG. 9 to determine the to-be-applied WA.

It should be noted that, when it is determined that the known failures have occurred both on the server and the network device, the decision processing unit 152 may perform either one of the processing in FIG. 6 and FIG. 9 to determine the to-be-applied WA, or alternatively may perform both of the processing in FIG. 6 and FIG. 9 to determine two WAs determined therethrough as the to-be-applied WAs.

As described above, the alert analysis section 150, which serves as the network management apparatus according to the present embodiment, acquires a plurality of alerts notified when a failure occurs, and determines whether the failure is the known failure or the unknown failure by referring to the alert management database 150*a*. When the alert analysis section 150 determines the failure to be the known failure that has occurred previously, the alert analysis section 150 determines, as the to-be-applied WA, the WA corresponding to one alert that is determined according to the predetermined ordering from among a plurality of notified alerts to execute the to-be-applied WA.

In this way, when a failure occurs, instead of comprehensively exploring the cause of the failure, the alert analysis section 150 determines whether or not the source of the alert is the event that has occurred previously based on the notified alert. When the source of the alert is determined to be a known event that has occurred previously, the alert analysis section 150 applies the WA that is already prepared and verified as the WA to be applied for the known event. At this time, the alert analysis section 150 selects one of a plurality of notified alerts and determines, as the to-be-applied WA, the WA corresponding to the selected alert. As a result, it makes it possible to determine and execute the to-be-applied WA more expeditiously and appropriately.

Telecom networks are large-scale, and there are a large number of network facilities such as servers, switches, and routers that constitute the telecom network. While various failures are likely to occur in those network facilities, respectively, since commercial networks are required to have higher reliability and higher availability, once a failure occurs, it is required to analyze the cause of the failure and restore the network expeditiously.

However, recent telecom networks are virtualized networks constituted with multiple layers by multiple vendors, and thus a plurality of alerts notifying of the occurrence of the failure are issued from a plurality of vendor products on a plurality of layers, respectively with respect to a single failure. For this reason, the number of alerts that need to be collated to identify the cause of the failure inevitably increases. In addition, in order to identify the cause of a failure, a plurality of types of vendor devices need to be analyzed, respectively, which requires a lot of time for sharing analysis information between the departments in charge of respective vendor devices and exchanging questions and answers. Due to the complexity of the analysis itself, it takes a long time to identify the cause of the failure, making it difficult to restore the system expeditiously.

According to the present embodiment, as described above, when a failure occurs and a plurality of alerts are resultantly notified, the alert analysis section 150 first determines whether the failure concerned is the known failure or the unknown failure by collating the events that have occurred previously, and, when the failure is determined to be the known failure, the alert analysis section 150 selects one of the plurality of notified alerts by filtering, and determines, as the to-be-applied WA, the corresponding WA that corresponds to the selected one alert. Therefore, it makes it possible to take measures against a failure that has occurred more expeditiously.

Here, the above described ordering for sorting alerts may be set, when the notified alert is a server-related alert, in order starting from the lowermost layer of the hierarchical structure in which the hardware, the OS, the virtualization layer, and the applications that constitute the server are stacked in this order. Likewise, when the alert is a network device-related alert, the ordering may be set in order starting from the lowermost layer of the hierarchical structure, which correspond to the transport layer and its lower layers of the network reference model realizing the communication functions of the network device.

Subsequently, the alert analysis section 150 may sequentially refer to the correlating information stored in the alert management database 150*a* for each of the plurality of notified alerts, respectively, according to the above ordering to determine whether or not the corresponding WA exists, and may determine, as the to-be-applied WA, the corresponding WA that corresponds to the alert for which the corresponding WA is first determined to exist.

It makes it possible to identify the suspected component more easily and expeditiously to determine the to-be-applied WA.

It should be noted that, although in the above embodiment, a certain case has been described in which alerts are sorted according to the ordering of components based on the hierarchical structure described above, the present embodiment is not limited thereto. The above ordering of components may be any ordering that enables identification of the suspected component, such as the ordering in descending order of the frequency of occurrence of failures of each of components.

Furthermore, when a plurality of notified alerts includes alerts notified at the same time from a plurality of types of devices, the alert analysis section 150 may determine that the complex failure has occurred in the plurality of types of devices, and determine the to-be-applied WA for the complex failure based on the alerts notified at the same time from the plurality of types of devices.

In this case, the alert analysis section 150 may determine, as the to-be-applied WA for the complex failure, the WA that is determined according to the above ordering, similarly to the case of the single failure, with respect to the device that is determined to have the known failure based on the notified alerts from among the plurality of types of devices.

In this way, by observing alerts related to a plurality of types of devices from a complex perspective, it makes it possible to determine the to-be-applied WA more appropriately to resolve the failure even for the events for which the to-be-applied WA cannot be determined appropriately solely with a single alert related to a single device.

Yet furthermore, the alert analysis section 150 refers to the alert management database 150a based on a plurality of alerts notified when a failure occurs, and when the failure that has occurred is determined to be the unknown failure, the alert analysis section 150 may issue the ticket including information on the failure to the department in charge and request the department to analyze the cause of the failure and perform the restoring operations. At this time, the alert analysis section 150 may issue the ticket to the management department of the component corresponding to one alert selected according to the above ordering from among the plurality of notified alerts.

This allows the analysis of the cause of the failure to be requested to the management department that manages the suspected component so that the operator who receives the analysis request is able to efficiently perform the analysis operation. In addition, since the ticket is not issued to the management department that manages the component with low possibility of the suspected component, it makes it possible to reduce the labor of the operator for that part of operations.

As described above, according to the present embodiment, it makes it possible to expeditiously deal with failures that occur in a large-scale network constructed on a virtualization infrastructure so as to shorten the time from the occurrence of a failure to recovery.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

When the network management apparatus is implemented on a single computer, the network management apparatus may include a CPU, a ROM, a RAM, an HDD, an input unit (e.g., keyboard, pointing device, or the like), a display unit (e.g., monitor, or the like), a communication I/F, and the like. In this case, at least a part of the functions of the constituent elements of the alert analysis section 150 shown in FIG. 3 may be performed by executing the program by the above CPU. However, at least a part of the constituent elements of the alert analysis section 150 shown in FIG. 3 may be operated as dedicated hardware. In this case, the dedicated hardware operates based on the control of the above CPU.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: Alert Analysis Section; 151: Alert Acquisition unit; 152: Decision Processing Unit; 153: WA Application Unit; 154: Ticket Issuance Unit

What is claimed is:

1. A network management apparatus, comprising:
at least one memory configured to store program code; and
electric circuitry including at least one processor, the at least one processor being configured to read and operate according to the program code, the electronic circuitry configured to:
store correlating information, about a failure that occurs in a network, that correlates a notification notified when the failure occurs to a workaround for the failure;
acquire, when the failure occurs in the network, a plurality of notifications that are notified in relation to a plurality of components related to a device in which the failure has occurred, respectively;
determine whether the failure is a known failure in which the notification is correlated to a workaround or an unknown failure in which the notification is not correlated to a workaround, by referring to the correlating information based on the plurality of notifications; and
determine, when the failure is determined to be the known failure, the workaround that is correlated to a notification determined according to a predetermined ordering of the components, from among the plurality of notifications, as the workaround to be applied,
wherein, when the plurality of notifications belong to a notification related to a server constituting a virtualized environment, the electronic circuitry is further configured to determine the workaround to be applied according to a sequential ordering starting from a lowermost layer of a hierarchical structure in sequential order in which hardware, an operating system (OS), a virtualization layer, and an application that constitute the server are in turn stacked forming the hierarchical structure.

2. The network management apparatus according to claim 1, wherein
determining the workaround sequentially refers to, for the plurality of notifications, the correlating information according to the ordering, determines whether or not the workaround correlated to the notification exists, and determines the workaround corresponding to a notification that is first determined to have a correlated workaround, as the workaround to be applied.

3. The network management apparatus according to claim 1, wherein,
when the plurality of notifications belong to a notification related to a network device, determining the workaround determines the workaround to be applied according to the ordering that is set in order starting from a lowermost layer of a hierarchical structure that corresponds to a transport layer and its lower layers of a network reference model realizing a communication function by the network device.

4. The network management apparatus according to claim 1, wherein,
when at least one of the plurality of notifications has a correlated workaround in the correlating information from among the plurality of notifications, determining the failure determines the failure to be the known failure.

5. The network management apparatus according to claim 1, wherein
the notification includes device information related to a device in which the failure has occurred and failure information related to a content of the failure.

6. The network management apparatus according to claim 1, wherein
the notification includes a device type indicating a type of a device in which the failure has occurred and time information indicating time of the failure, and,
when the plurality of notifications include notifications notified at the same time from a plurality of types of devices, determining the workaround determines that a complex failure has occurred in the plurality of types of devices, and determines the workaround to be applied for the complex failure based on the notifications notified at the same time from the plurality of types of devices.

7. The network management apparatus according to claim 6, wherein
determining the failure determines, when the plurality of notifications include notifications notified at the same time from a plurality of types of devices, whether the failure is the known failure or the unknown failure for each of the devices, and
determining the workaround determines, when the plurality of notifications include notifications notified at the same time from the plurality of types of devices, the workaround correlated to the notification that is determined according to the ordering from among the plurality of notifications related to the device of which failure is determined to be the known failure, as the workaround to be applied to the complex failure.

8. The network management apparatus according to claim 1, the electric circuitry further configured to:
execute the workaround determined.

9. The network management apparatus according to claim 1, the electric circuitry further configured to:
inform of, when the failure is determined to be the unknown failure, information related to the failure.

10. The network management apparatus according to claim 9, wherein
informing informs of the information related to the failure to a management department of a component corresponding to a single notification determined according to the ordering from among the plurality of notifications.

11. A network management method performed by a network management apparatus, comprising steps of:
storing correlating information, about a failure that occurs in a network, that correlates a notification notified when the failure occurs to a workaround for the failure;
acquiring, when the failure occurs in the network, a plurality of notifications that are notified in relation to a plurality of components related to a device in which the failure has occurred, respectively;
determining whether the failure is a known failure in which the notification is correlated to a workaround or an unknown failure in which the notification is not correlated to a workaround, by referring to the correlating information based on the plurality of notifications;
and determining, when the failure is determined to be the known failure, the workaround that is correlated to a notification determined according to a predetermined ordering of the components, from among the plurality of notifications, as the workaround to be applied,
wherein, when the plurality of notifications belong to a notification related to a server constituting a virtualized environment, the determining the workaround comprises determining the workaround to be applied according to a sequential ordering starting from a lowermost layer of a hierarchical structure in sequential order in which hardware, an operating system (OS), a virtualization layer, and an application that constitute the server are in turn stacked forming the hierarchical structure.

12. A non-transitory computer-readable recording medium having recorded thereon a network management computer program product executable by a computer for causing the computer to execute network management processing, the computer program product causing the computer to execute processing comprising:
a correlating information storage process for storing correlating information, about a failure that occurs in a network, that correlates a notification notified when the failure occurs to a workaround for the failure;
a notification acquisition process for acquiring, when the failure occurs in the network, a plurality of notifications that are notified in relation to a plurality of components related to a device in which the failure has occurred, respectively;
a failure determination process for determining whether the failure is a known failure in which the notification is correlated to a workaround or an unknown failure in which the notification is not correlated to a workaround, by referring to the correlating information stored by the correlating information storage process based on the plurality of notifications acquired by the notification acquisition process; and
a workaround determination process for determining, when the failure is determined to be the known failure by the failure determination process, the workaround that is correlated to a notification determined according to a predetermined ordering of the components, from among the plurality of notifications acquired by the notification acquisition process, as the workaround to be applied, wherein, when the plurality of notifications belong to a notification related to a server constituting a virtualized environment, determining the workaround comprises determining the workaround to be applied according to a sequential ordering starting from a lowermost layer of a hierarchical structure in sequential order in which hardware, an operating system (OS), a virtualization layer, and an application that constitute the server are in turn stacked forming the hierarchical structure.

\* \* \* \* \*